US012391244B2

United States Patent
Shukla et al.

(10) Patent No.: US 12,391,244 B2
(45) Date of Patent: Aug. 19, 2025

(54) METHOD AND SYSTEM FOR NARROW PASSAGE PATH SAMPLING BASED ON LEVY FLIGHT

(71) Applicant: Tata Consultancy Services Limited, Mumbai (IN)

(72) Inventors: Shubham Shukla, Kolkata (IN); Debojyoti Chakraborty, Kolkata (IN); Titas Bera, Kolkata (IN); Ranjan Dasgupta, Kolkata (IN); Lokesh Kumar, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 537 days.

(21) Appl. No.: 17/662,043

(22) Filed: May 4, 2022

(65) Prior Publication Data

US 2023/0001920 A1   Jan. 5, 2023

(30) Foreign Application Priority Data

May 28, 2021   (IN) .............................. 202121023849

(51) Int. Cl.
*B60W 30/095*   (2012.01)
*B60W 60/00*   (2020.01)
(Continued)

(52) U.S. Cl.
CPC ...... *B60W 30/095* (2013.01); *B60W 60/0016* (2020.02); *G01B 21/02* (2013.01);
(Continued)

(58) Field of Classification Search
CPC . G01M 13/045; F16C 19/527; F16C 2233/00; G05B 19/0423;
(Continued)

(56) References Cited

U.S. PATENT DOCUMENTS 10,521,473 B2 * 12/2019 Jin .......................... G06Q 50/01
10,901,425 B2 *  1/2021 Trautman ............... G01C 21/20
(Continued)

OTHER PUBLICATIONS

Frederico, L. A., Martins-Filho, L., & da Silva, ,A.L. (2015). Navigation and control of an UAV quadrotor in search and surveillance missions. Journal of Physics: Conference Series, 641(1) doi:https://doi.org/10.1088/1742-6596/641/1/012031 (Year: 2015).*
(Continued)

*Primary Examiner* — Huy Q Phan
*Assistant Examiner* — Martin Walter Braunlich
(74) *Attorney, Agent, or Firm* — Finnegan, Henderson, Farabow, Garrett & Dunner, LLP (57) ABSTRACT

Method and system for narrow passage path sampling based on levy flight is disclosed. The disclosed technique is an improvisation of Random Walk to Surface (RWS), wherein, instead of performing a random walk, the disclosed technique utilizes levy flight mechanism to identify samples in narrow passages (on the obstacle boundaries). The disclosed technique for identification of narrow passages sampling points in the narrow passage is based on several techniques that include random uniform sampling technique, a levy flight function (step size) and a collision detection technique. Moreover, in addition to identification of narrow passages sampling points, the disclosed technique also performs an additional check to ensure that the identified narrow passages sampling points are present in the narrow passage based on a levy flight bridge sampler technique.

7 Claims, 9 Drawing Sheets (51) Int. Cl.
*G01B 21/02* (2006.01)
*G01B 21/16* (2006.01)
*G01B 21/20* (2006.01)
*G01B 21/30* (2006.01)
*G01C 21/20* (2006.01)
*G01C 21/36* (2006.01)

(52) U.S. Cl.
CPC .............. *G01B 21/16* (2013.01); *G01B 21/20* (2013.01); *G01B 21/30* (2013.01); *G01C 21/20* (2013.01); *G01C 21/3605* (2013.01); *B60W 2554/4049* (2020.02)

(58) Field of Classification Search
CPC ........... G05B 2219/25428; G05B 2219/37494; G05D 1/0214; G01C 21/34; G01C 21/3446
See application file for complete search history.

(56) References Cited

U.S. PATENT DOCUMENTS

| | | | | |
|---|---|---|---|---|
| 11,530,921 | B2* | 12/2022 | Nimmagadda | G08G 5/80 |
| 11,686,874 | B2* | 6/2023 | Xiang | G01V 1/3843 |
| | | | | 367/131 |
| 11,767,026 | B2* | 9/2023 | Sadhu | B60W 60/001 |
| | | | | 701/25 |
| 2023/0282116 | A1* | 9/2023 | Choi | G08G 5/59 |
| | | | | 701/120 |

OTHER PUBLICATIONS

Mohanty, P. K., & Parhi, D. R. (2016). Optimal path planning for a mobile robot using cuckoo search algorithm. Journal of Experimental & Theoretical Artificial Intelligence, 28(1/2), 35-52. https://doi.org/10.1080/0952813X.2014.971442 (Year: 2016).*

Yao, P., & Wang, H. (2017). Dynamic adaptive ant lion optimizer applied to route planning for unmanned aerial vehicle. Soft Computing, 21(18), 5475-5488. doi:https://doi.org/10.1007/s00500-016-2138-6 (Year: 2017).*

K. Cao, Q. Cheng, S. Gao, Y. Chen and C. Chen, "Improved PRM for Path Planning in Narrow Passages," 2019 IEEE International Conference on Mechatronics and Automation (ICMA), Tianjin, China, 2019, pp. 45-50, doi: 10.1109/ICMA.2019.8816425. (Year: 2019).*

Lee, Jung-Hwan, "Sampling-based motion planning algorithm to handle a narrow passage problem", Computer Science, Date: Nov. 2014, Publisher: Semantic Scholar, https://solab.kaist.ac.kr/thesis/JunghwanLee_dissertation.pdf.

Sun, Zheng et al., "Narrow passages identification for Probabilistic Roadmap Method", Transaction on Robotics, Date: 2003, Publisher: IEEE, https://bigbird.comp.nus.edu.sg/m2ap/wordpress/wp-content/uploads/2016/01/tro05.pdf.

Pang, Bao et al., "Narrow passages identification for Probabilistic Roadmap Method", Journal of Robotics, Date: Mar. 2019, Publisher: Hindawi, https://pdfs.semanticscholar.org/37bb/27b91571a34a00cd93f068734eeb0f06572b.pdf?_ga=2.168537762.2021821650._1650452142-1635883128.1626151822.

* cited by examiner

METHOD AND SYSTEM FOR NARROW PASSAGE PATH SAMPLING BASED ON LEVY FLIGHT

PRIORITY CLAIM

This U.S. patent application claims priority under 35 U.S.C. § 119 to: India Application No. 202121023849, filed on 28 May 2021. The entire contents of the aforementioned application are incorporated herein by reference.

TECHNICAL FIELD

The disclosure herein generally relates to the field of probabilistic roadmap planners (PRM) in motion planning of robots with higher degrees of freedom, and, more particularly, to a method and a system for narrow passage path sampling based on levy flight.

BACKGROUND

In the research of autonomous mobile robots/autonomous vehicles, path planning is a core part of extensive area of research. Path planning/motion planning, for autonomous vehicles is a process of finding a contiguous path to travel from a source to destination in a real time environment.

Traditional path planning methods include Artificial Potential Field Theory (A-PFT), Probabilistic Roadmaps (PRM), Rapidly-Exploring Random Trees (RRT), etc. However, the traditional path planning methods require accurate map of the environment, wherein the environment is usually complicated with several obstacles. Further the existing standard path planning method sampling based approaches, viz. PRM, RRT are efficient for environments that have high uncertainty and high-dimensional maps. However, the standard path planning may not be very efficiently in all scenarios and applications such as a narrow passage scenario.

Narrow passage scenario includes constrained spaces between obstacles or between the obstacles and the environment boundary. It is very important to identify narrow passages present in the environment to obtain an effective path planning. However, path planning in narrow passage scenario is quite challenging due to difficulty in obtaining sample points as the area of free space is relatively lesser compared to the complete environment. Also, while generating sampling points in narrow passage it is also important to effectively improve the sample density in such regions to plan a path effectively.

SUMMARY

Embodiments of the present disclosure present technological improvements as solutions to one or more of the above-mentioned technical problems recognized by the inventors in conventional systems. For example, in one embodiment, a method and a system for narrow passage path sampling based on levy flight is provided. The system includes a memory storing instructions, one or more communication interfaces; and one or more hardware processors coupled to the memory via the one or more communication interfaces, wherein the one or more hardware processors are configured by the instructions to receive a plurality of inputs associated with a plurality of obstacles within a narrow passage of an environment, via a one or more hardware processors, wherein the plurality of inputs comprise a plurality of dimensions of a configuration space of each of the plurality of obstacles, a plurality of obstacle geometry of each of the plurality of obstacles, wherein the plurality of dimension of the configuration space comprise of a plurality of obstacle space and a plurality of free spaces. The system is further configured to identify a step size, via the one or more hardware processors, based on the plurality of dimensions of the configuration space of each of the plurality of obstacles and the plurality of obstacle geometry using a probability distribution function technique. The system is further configured to iteratively determine a plurality narrow passage sampling points in the narrow passage for the narrow passage path sampling, via the one or more hardware processors, wherein the step of the determining the narrow passage sample among the plurality narrow passages sampling point, comprises: generating a random configuration in the obstacle based on a random uniform sampling technique, wherein the random configuration comprises a position defined by x, y and z coordinates and an orientation defined by Euler angles; identifying a sampling point using the random configuration based on a levy flight function and a collision detection technique, wherein the sampling point lies in the plurality of free spaces and outside the plurality of obstacle space; and identifying, based on a levy flight bridge sampler technique, the narrow passage sample for narrow passage path sampling from the sampling point.

In another aspect, a method for narrow passage path sampling based on levy flight is provided. The method includes receiving a plurality of inputs associated with a plurality of obstacles within a narrow passage of an environment wherein the plurality of inputs comprise a plurality of dimensions of a configuration space of each of the plurality of obstacles, a plurality of obstacle geometry of each of the plurality of obstacles, wherein the plurality of dimension of the configuration space comprise of a plurality of obstacle space and a plurality of free spaces. The method further includes identifying a step size based on the plurality of dimensions of the configuration space of each of the plurality of obstacles and the plurality of obstacle geometry using a probability distribution function technique. The method further includes iteratively determining a plurality narrow passage sampling points in the narrow passage for the narrow passage path sampling, wherein the step of the determining the narrow passage sample among the plurality narrow passages sampling point, comprises: generating a random configuration in the obstacle based on a random uniform sampling technique, wherein the random configuration comprises a position defined by x, y and z coordinates and an orientation defined by Euler angles; identifying a sampling point using the random configuration based on a levy flight function and a collision detection technique, wherein the sampling point lies in the plurality of free spaces and outside the plurality of obstacle space; and identifying, based on a levy flight bridge sampler technique, the narrow passage sample for narrow passage path sampling from the sampling point.

In yet another aspect, a non-transitory computer readable medium for narrow passage path sampling based on levy flight is provided. The program includes receiving a plurality of inputs associated with a plurality of obstacles within a narrow passage of an environment wherein the plurality of inputs comprise a plurality of dimensions of a configuration space of each of the plurality of obstacles, a plurality of obstacle geometry of each of the plurality of obstacles, wherein the plurality of dimension of the configuration space comprise of a plurality of obstacle space and a plurality of free spaces. The program further includes identifying a step size based on the plurality of dimensions of the configuration space of each of the plurality of obstacles and the plurality of obstacle geometry using a probability distribution function technique. The program further includes iteratively determining a plurality narrow passage sampling points in the narrow passage for the narrow passage path sampling, wherein the step of the determining the narrow passage sample among the plurality narrow passages sampling point, comprises: generating a random configuration in the obstacle based on a random uniform sampling technique, wherein the random configuration comprises a position defined by x, y and z coordinates and an orientation defined by Euler angles; identifying a sampling point using the random configuration based on a levy flight function and a collision detection technique, wherein the sampling point lies in the plurality of free spaces and outside the plurality of obstacle space; and identifying, based on a levy flight bridge sampler technique, the narrow passage sample for narrow passage path sampling from the sampling point.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Narrow passage scenario includes constrained spaces between obstacles or between the obstacles and the environment boundary. It is very important to identify narrow passages present in the environment to obtain an effective path planning. However, path planning in narrow passage scenario is quite challenging. The existing standard techniques such as Probabilistic Roadmaps (PRM) samples the free space randomly and connects the sample points, called roadmap, to generate a path between the source and destination points. However, because of the probability property of the sampling strategy of the PRM, the sampling probability of each region in the map remains the same. Therefore, when the number of sampling points is constant, more the sampling points are generated for the large area the area of a free space while making it difficult to obtain sample points in narrow passages, where the area of free space is much less. Similarly, in RRT, the sampling of random points for expansion of the tree is uniform, hence making it very important to identify narrow passages present in the environment while generating sampling points to effectively improve the sample density in such regions.

The disclosed technique for narrow passage path sampling based on levy flight is an improvisation of existing techniques. The disclosed technique is based on Random Walk to Surface (RWS), wherein sample configurations are generated on the obstacle boundaries. However, instead of performing a random walk, the proposed technique utilizes the levy flight mechanism to identify samples.

Referring now to the drawings, and more particularly to FIG. 1 through FIG. 8, where similar reference characters denote corresponding features consistently throughout the figures, there are shown preferred embodiments and these embodiments are described in the context of the following exemplary system and/or method.

Figure 1:
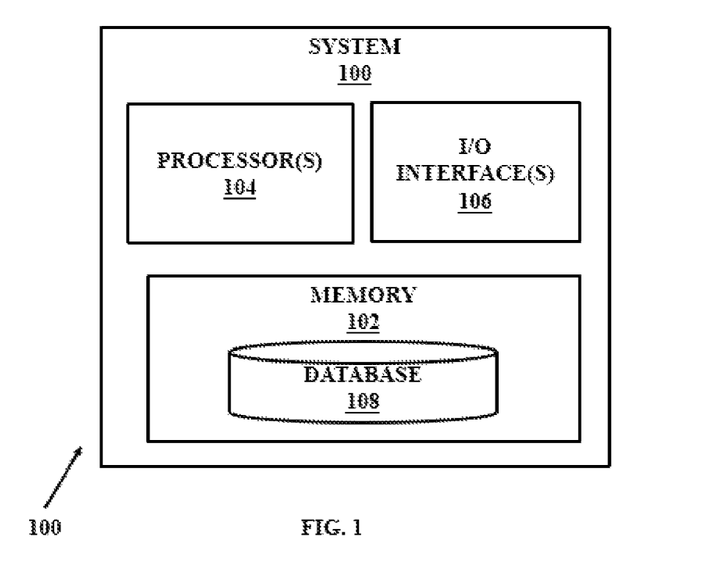
FIG. 1 illustrates an exemplary system for narrow passage path sampling based on levy flight, according to some embodiments of the present disclosure.

FIG. 1 is a functional block diagram of a system 100 for narrow passage path sampling based on levy flight in accordance with some embodiments of the present disclosure.

In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, a network cloud and the like.

The I/O interface(s) 106 can include a variety of software and hardware interfaces, for example, a web interface, a graphical user interface, a touch user interface (TUI) and the like and can facilitate multiple communications within a wide variety of networks N/W and protocol types, including wired networks, for example, LAN, cable, etc., and wireless networks, such as WLAN, cellular, or satellite. In an embodiment, the I/O interface (s) 106 can include one or more ports for connecting a number of devices (nodes) of the system 100 to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the memory 102 may include a database 108, wherein the database 108 includes information related to algorithms related to performing narrow passage sampling. Thus, the memory 102 may comprise information pertaining to input(s)/output(s) of each step performed by the processor(s) 104 of the system 100 and methods of the present disclosure. In an embodiment, the database 108 may be external (not shown) to the system 100 and coupled to the system via the I/O interface 106.

Figure 2:
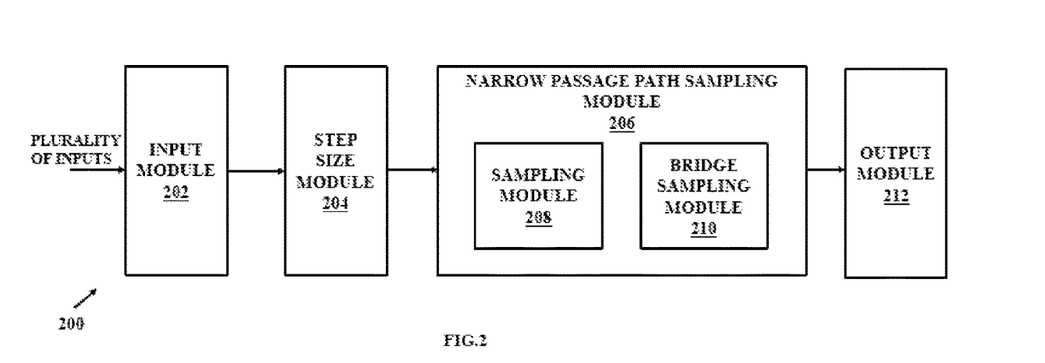
FIG. 2 is a functional block diagram of the system(100) for narrow passage path sampling based on levy flight, according to some embodiments of the present disclosure.
Figure 3A:
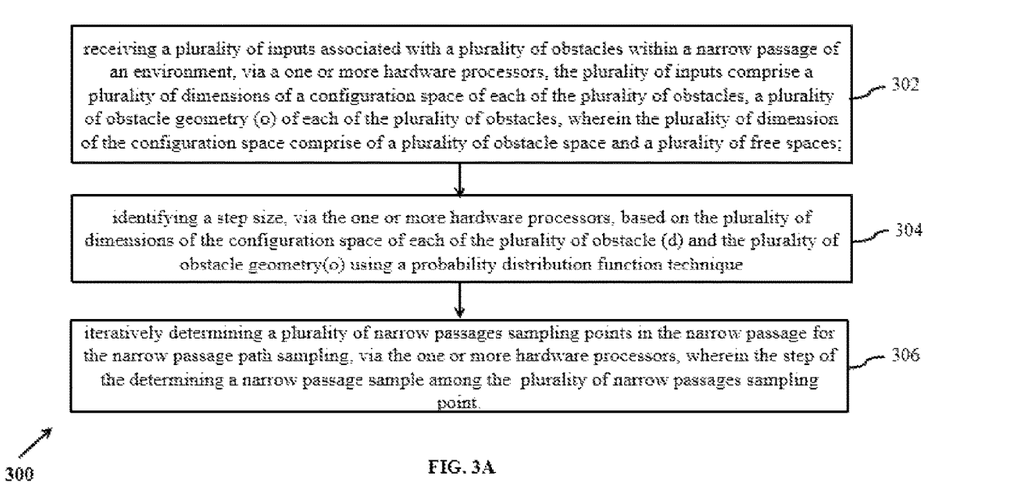
FIG. 3A and FIG. 3B is a flow diagram illustrating a method for narrow passage path sampling based on levy flight, in accordance with some embodiments of the present disclosure.
Figure 3B:
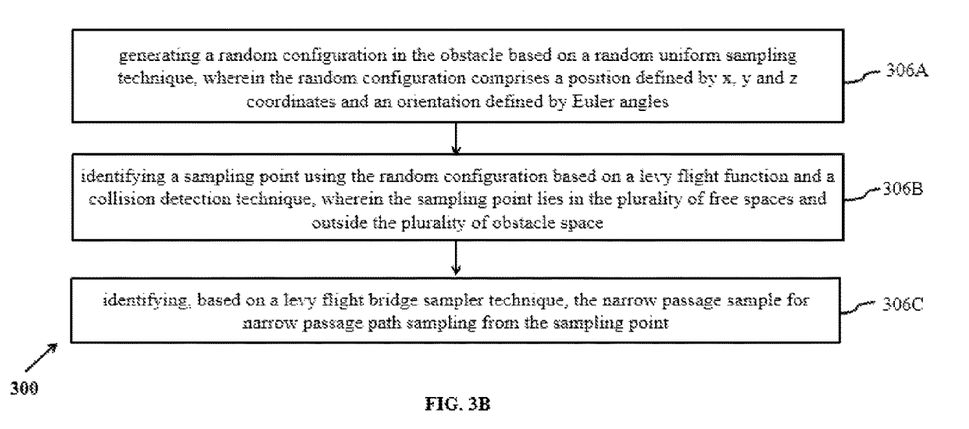

Functions of the components of system 100 are explained in conjunction with functional overview of the system 100 in FIG. 2 and flow diagram of FIGS. 3A and 3B for narrow passage path sampling based on levy flight.

The system 100 supports various connectivity options such as BLUETOOTH®, USB, ZigBee and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. The components and functionalities of the system 100 are described further in detail.

FIG. 2 is a functional block diagram of the various modules of the system of FIG. 1, in accordance with some embodiments of the present disclosure. As depicted in the architecture, the FIG. 2 illustrates the functions of the components of the system 100 that includes for narrow passage path sampling based on levy flight.

The system 200 for narrow passage path sampling based on levy flight is configured for receiving a plurality of inputs associated with a plurality of obstacles within a narrow passage of an environment using an input/output module 202. The received plurality of inputs is used for identifying a step size in a step size module 204. Further a plurality narrow passages sampling points are determined for the narrow passage in a narrow passage path sampling module 206. The process of determination of plurality narrow passages sampling points comprises of several steps that includes generating a random configuration and identifying a sampling point in a sampling module 208. Further using the sampling point, the narrow passage samples are identified for narrow passage path sampling in a bridge sampling module 210. Finally, the identified narrow passage path samplings are displayed on an output module 212.

The various modules of the system 100 for narrow passage path sampling based on levy flight are implemented as at least one of a logically self-contained part of a software program, a self-contained hardware component, and/or, a self-contained hardware component with a logically self-contained part of a software program embedded into each of the hardware component that when executed perform the above method described herein.

Functions of the components of the system 200 are explained in conjunction with functional modules of the system 100 stored in the memory 102 such as the input/output module 202, the step size module 204, the narrow passage path sampling module 206, the sampling module 208 and the bridge sampling module 210 and further explained in conjunction with flow diagram of FIGS. 3A and 3B. The FIG. 3A and FIG. 3B, with reference to FIG. 1, is an exemplary flow diagram illustrating a method 300 for using the system 100 of FIG. 1 for narrow passage path sampling based on levy flight according to an embodiment of the present disclosure.

The steps of the method of the present disclosure will now be explained with reference to the components of the system(100) for narrow passage path sampling based on levy flight and the modules (202-212) as depicted in FIG. 2 and the flow diagrams as depicted in FIG. 3A and FIG. 3B. Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

At step 302 of the method (300), a plurality of inputs associated with a plurality of obstacles within a narrow passage of an environment is received at the input/output module 202. The plurality of inputs comprises a plurality of dimensions of a configuration space of each of the plurality of obstacles, a plurality of obstacle geometry (o) of each of the plurality of obstacles. The plurality of dimension of the configuration space comprise of a plurality of obstacle space ($C_{obs}$) and a plurality of free spaces ($C_{free}$).

In an embodiment, narrow passage in an environment includes constrained spaces between obstacles or between the obstacles and the environment boundary. In an example scenario, a step-size depending on input d is considered, wherein for a 2D environment, where only point objects are sampled, then the dimension of the $C_{space}$ is 2. Hence, two values (x,y) as positions to be determined on performing the levy flight. Similarly, if dimensions increase as in manipulator sampling or 3D sampling, the number of levy distribution values would also increase. Basically, the number of levy distribution values required is equal to the dimension of the $C_{space}$.

At the next step 304 of the method (300), a step size ($\alpha$) is identified at step size module 204. The step size is identified based on the plurality of dimensions of the configuration space of each of the plurality of obstacle (d) and the plurality of obstacle geometry(o) using a probability distribution function technique.

In an embodiment, the proposed technique is based on Random Walk to Surface(RWS), wherein sample configurations are generated on the obstacle boundaries. However, instead of performing a random walk, the proposed technique utilizes the levy flight mechanism. The Levy flight is a category of random walk in which the random walk step-size has a Levy distribution, a probability distribution that is heavy-tailed. The PDF of the length X of each step is a power law function and is expressed as shown below:

$$f_x(x) \sim x^{-\alpha} \quad (1)$$

wherein, $$0 < \alpha < 2, E[X^2] = \infty$$

Based in equation 1, $\alpha$ is heuristically defined based on the plurality of obstacle (d) and the plurality of obstacle geometry(o) between 0 and 2 wherein a higher value of $\alpha$ implies small steps and occasional long jumps which makes it difficult for a random walker to return to the starting point. Hence, making the walk intrinsically exploratory.

At the next step 306 of the method (300), a plurality of narrow passages sampling points in the narrow passage is iteratively determined for the narrow passage path sampling in the narrow passage path sampling module 206.

In an embodiment, the step of the determining a narrow passage sample among the plurality of narrow passages sampling point, comprises of several steps that includes:
  (i) Generating a random configuration in the sampling module 208 within the narrow passage path sampling module 206.
  (ii) Identifying a sampling point in in the sampling module 208 within the narrow passage path sampling module 206.
  (iii) Identifying the narrow passage samples narrow passage path sampling using the sampling point, in the bridge sampling 210 within the narrow passage path sampling module 206.

Referring to FIG. 3B, wherein the step of the determining a narrow passage sample among the plurality of narrow passages sampling point is explained.

At step 306A of the method (300), a random configuration $(q,\theta)$ is generated in the obstacle in the sampling module 208. The random configuration comprises a position (q) defined by x, y and z coordinates and an orientation ($\theta$) defined by Euler angles ($\Psi$, $\theta$, $\Phi$). The random configuration $(q,\theta)$ is generated based on a random uniform sampling technique.

In an embodiment, the random uniform sampling technique used includes a uniform sampling based on normal distribution (N). The uniform sampling based on N gives values from −1 to 1, wherein the non-negative values of N are considered using modulus operator. Considering a min and a max as the lower and upper boundary limits of an environment, then a random sample (R) can be calculated as shown below:

$$R=(max-min)*|N|+min \quad (2)$$

At step 306B of the method (300), a sampling point $(q',\theta')$ is identified in the sampling module 208. The sampling point $(q',\theta')$ is identified using the random configuration $(q,\theta)$ based on a levy flight function and a collision detection technique. The sampling point $(q', \theta')$ lies in the plurality of free spaces $(C_{free})$ and outside the plurality of obstacle space $(C_{obs})$.

In an embodiment, a Levy Flight function to generate a sampling point. The position of new configuration of a sampling position (q') is identified from q based on Levy Flight function $(f_L(l))$. The sampling position (q') can be expressed as shown below:

$$q' \leftarrow q(\alpha + f_L(l)) \quad (3)$$

The position of new configuration of a sampling orientation ($\theta'$) is identified from $\theta$ based on Levy Flight function $(f_L(l))$. The sampling orientation ($\theta'$) can be expressed as shown below:

$$\theta'=2\pi(1-e^{f_\theta(\theta)}) \quad (4)$$

In an example scenario, the $\alpha$ is chosen as 1.9 for $f_L(l)$ and as $\alpha=1.1$ for $f_\theta(\theta)$.

At step 306C of the method (300), the narrow passage sample for narrow passage path sampling is identified in the bridge sampling module 210. The narrow passage sample is identified from the sampling point $(q',\theta')$ based on a levy flight bridge sampler technique.

Figure 4:
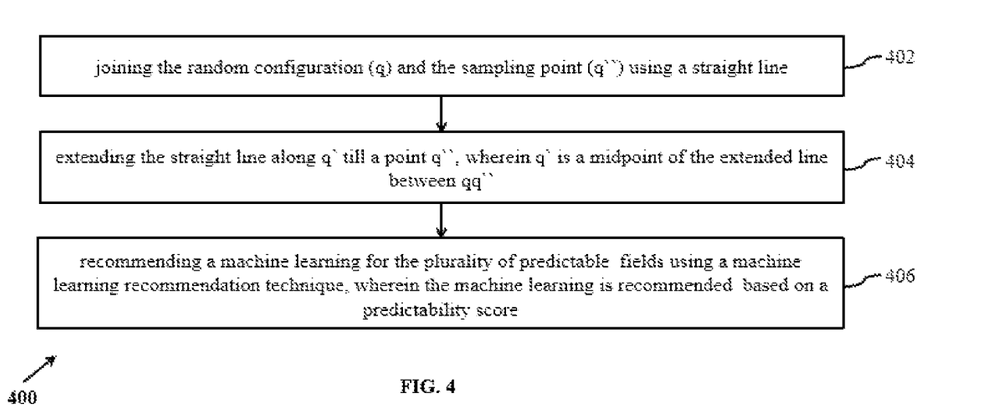
FIG. 4 a flow diagram illustrating a method for the levy flight bridge sampler technique during narrow passage path sampling based on the levy flight in accordance with some embodiments of the present disclosure.

The levy flight bridge sampler technique is depicted as a flow chart in FIG. 4. The levy flight bridge sampler technique comprises of the following steps:

At step 402 of the method (400), the random configuration $(q,\theta)$ and the sampling point $(q',\theta')$ are joined to form a straight line.

In an embodiment, considering an example scenario for a point sampling in 2D environment, wherein q=(x,y) and q'=(x',y') and a line is drawn from a point (x,y) to another point (x',y') and its length is represented by L. Hence a line is drawn from (x',y') to find a sample q" at same length L from q'.

At the next step 404 of the method (400), the straight line is extended along q' till a point q", wherein q' is a midpoint of the extended line between qq".

In an embodiment, the extension of straight line can be expressed as shown below:

$$(q,\theta) \cdot q' = (q+q'')/2 \quad (5)$$

At the next step 404 of the method (400), the sampling point) is identified as a narrow passage sampling point based on determining if the point q" lies in the plurality of obstacle space $(C_{obs})$ based on the collision detection technique.

In an embodiment, the collision detection technique includes a OpenGL based collision detection technique.

The identified narrow passage path samplings are displayed on an output module 212.

EXPERIMENTS

The performance of the above disclosed narrow passage sampling methods is compared with the standard Gaussian sampler, Randomized Bridge Builder Sampler (RBBS) and Random Walk Sampler (RWS). The comparison has been done by extensively simulating narrow passage scenarios in 2-D as well as 3-D environments. In 2-D environment, experiments are conducted for a 3-link, 5- link and 7-link manipulator, and the results are simulated considering a Bar Shape, a Joint Shape and a Teeth Shape obstacle scenario. The environment considered for simulation is a 100 unit sided square area and cube volume in 2-D and 3-D respectively. The width of the narrow passage between the obstacles varies between 5 to 10 units depending on the obstacle scenario. For comparison, the total execution time $t_\in$ and number of collision checking calls $\gamma_c$ to generate a fixed number of candidate samples, $K_c$, here $K_c=30$, are considered. To have a comprehensive comparison of all the above mentioned parameters, all the algorithms are run in the simulated environment with step-size, $\alpha$, varying from 2 units to 20 units. Algorithms are executed for 300 times for each obstacle scenario and for each step-size, to approximate the average case performance.

Figure 5:
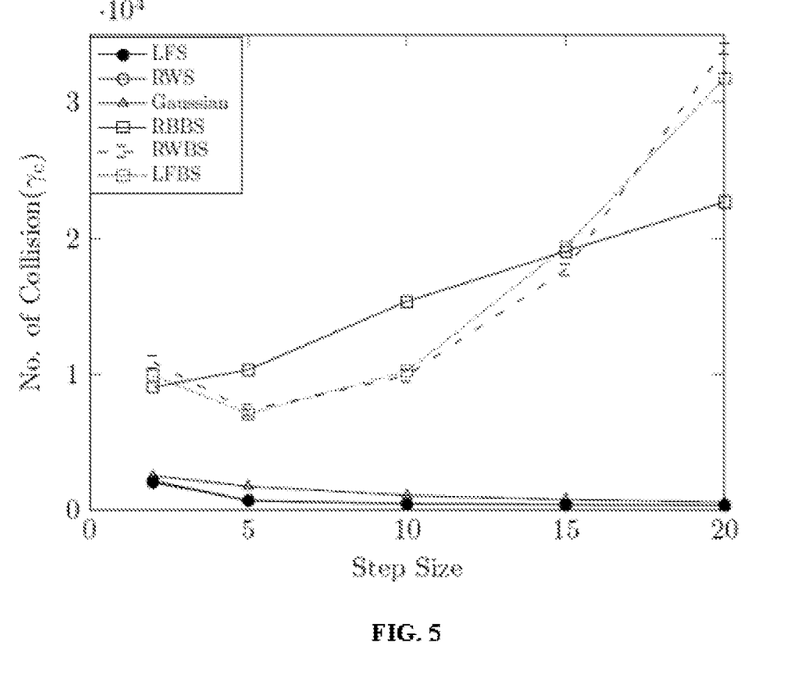
FIG. 5 and FIG. 6 is a graph illustrating a simulation results in 3D-environment for a joint shape obstacle scenario to determine narrow passage path sampling based on the levy flight in accordance with some embodiments of the present disclosure.
Figure 6:
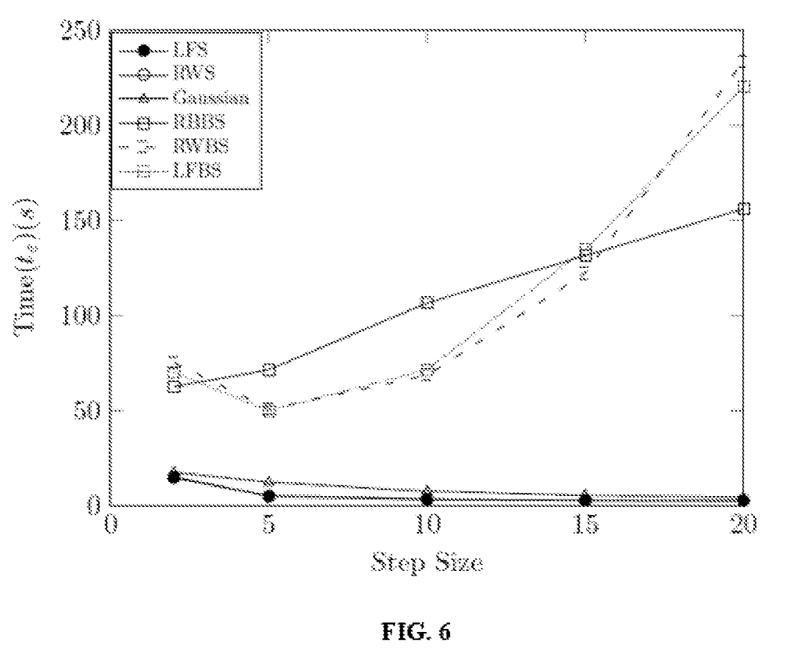
Figure 7:
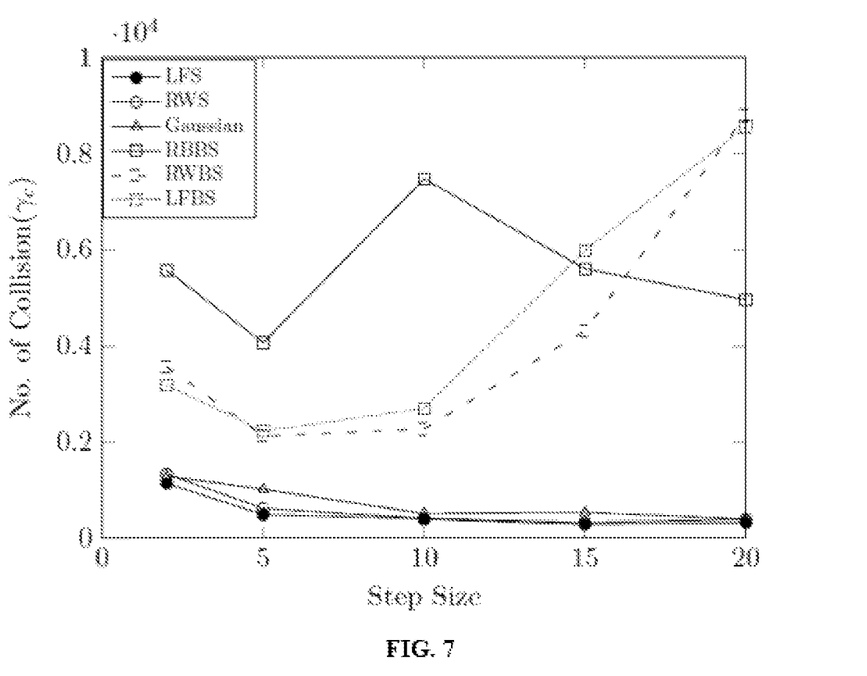
FIG. 7 and FIG. 8 is a graph illustrating a simulation results in 3D-environment for a teeth shaped obstacle scenario to determine narrow passage path sampling based on the levy flight in accordance with some embodiments of the present disclosure.
Figure 8:
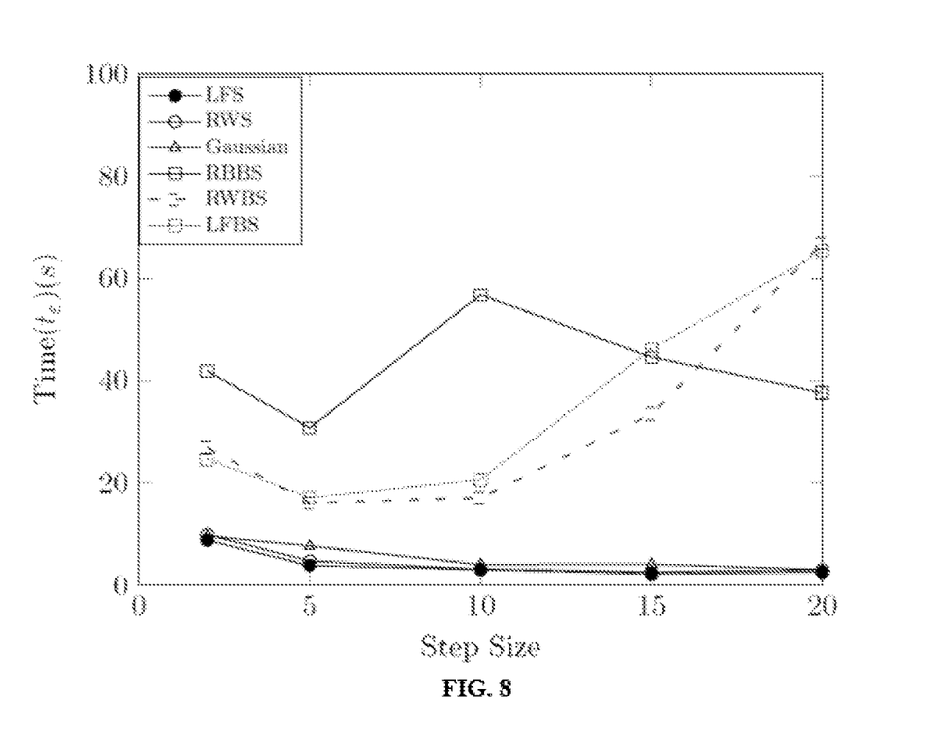

The simulation results in 3D-environment are depicted in FIG. 5 to FIG. 8. For a joint shape obstacle scenario, FIG. 5 and FIG. 6 shows that $t_\in$ and $\gamma_c$ for Levy Flight Bridge Sampler (LFBS) and Randowm Walk Bridge Sampler (RWBS) are less than or comparable to those of the disclosed technique. For the teeth shaped obstacle scenario, results obtained show superiority of LFBS and RWBS in terms of time/collision checks and sampling quality, as is evident from FIG. 7 and FIG. 8 that show the results with reference to $t_\in$ and $\gamma_c$. These results are for the simulation of an L-shaped plank within the narrow regions between the obstacles. Hence based on the results it can be concluded that most samples generated using state of art techniques are not in the critical zone/narrow passage, however the disclosed techniques are evidently more efficient.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure of narrow passage path sampling based on levy flight is an improvisation of existing techniques path planning techniques, especially pure random walk based methods. The disclosed technique is an improvisation of Random Walk to Surface (RWS), wherein sample configurations are generated on the obstacle boundaries. However, in comparison with traditional RWS, instead of performing a random walk, the disclosed technique (represented as LFS) utilizes the levy flight mechanism to identify samples in narrow passages (on the obstacle boundaries). The embodiment thus provides improvised sample quality at the expense of a minimum additional computation, when compared with pure random walk based methods. The disclosed technique (represented as LFS) for identification of narrow passages sampling points in the narrow passage is based on several techniques that include random uniform sampling technique, a levy flight function (step size) and a collision detection technique. Moreover, in addition to identification of narrow passages sampling points, the disclosed technique also performs an additional check to ensure that the identified narrow passages sampling points are present in the narrow passage based on a levy flight bridge sampler technique.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method comprising:
receiving a plurality of inputs associated with a plurality of obstacles within a narrow passage of a real time environment, via a one or more hardware processors, the plurality of inputs comprise a plurality of dimensions of a configuration space of each of the plurality of obstacles (d), a plurality of obstacle geometry (o) of each of the plurality of obstacles, wherein the plurality of dimension of the configuration space comprise of a plurality of obstacle space ($C_{obs}$) and a plurality of free spaces ($C_{free}$), wherein the narrow passage is a constrained space between the plurality of obstacle space ($C_{obs}$) and the plurality of free spaces ($C_{free}$);
identifying a step size ($\alpha$), via the one or more hardware processors, based on the plurality of dimensions of the configuration space of each of the plurality of obstacles (d) and the plurality of obstacle geometry (o) using a probability distribution function technique;
iteratively determining a plurality narrow passage sampling points in the narrow passage for the narrow passage path sampling, via the one or more hardware processors, wherein the step of the determining the narrow passage sample among the plurality narrow passages sampling point, comprises:

generating a random configuration (q,θ) in the obstacle based on a random uniform sampling technique, wherein the random configuration comprises a position (q) defined by x, y and z coordinates and an orientation (θ) defined by Euler angles (Ψ, Θ,Φ);

identifying a sampling point (q',θ') using the random configuration (q,θ) based on a levy flight function and a collision detection technique, wherein the levy flight function is a category of random walk in which the step size (α) has a levy distribution, wherein the sampling point (q', θ') lies in the plurality of free spaces ($C_{free}$) and outside the plurality of obstacle space ($C_{obs}$), wherein when the dimension of the configuration space increase as in a manipulator sampling or a 3-dimensional (3D) sampling, then a number of levy distribution values increase, wherein the number of levy distribution values is equal to the dimension of the configuration space; and identifying, based on a levy flight bridge sampler technique, the narrow passage sample for narrow passage path sampling from the sampling point (q', θ'), wherein the levy flight bridge sampler technique comprises of:

joining the random configuration (q,θ) and the sampling point (q',θ') using a straight line;

extending the straight line along q' till a point q'', wherein q' is a midpoint of the extended line between qq'', wherein extension of the straight line is expressed as: (q,θ). q'=(q+q'')/2; and identifying the sampling point (q',θ') as a narrow passage the sampling point based on determining if the point q'' lies in the plurality of obstacle space ($C_{obs}$) based on the collision detection technique;

simulating narrow passage scenarios in 2-dimensional (2D) and 3-dimensional (3D) environments, wherein simulations are conducted for a 3-link, 5-link and 7-link manipulator, and results are simulated considering a bar shape obstacle scenario, a joint shape obstacle scenario and a teeth shape obstacle scenario, wherein for the joint shape obstacle scenario, a total execution time and a number of collision checking calls for levy flight bridge sampler are less, and wherein for the teeth shape obstacle scenario, simulation results obtained indicate superiority of the levy flight bridge sampler in terms of sampling quality; and displaying in real time the identified narrow passage path sampling on an output module.

2. The processor implemented method of claim 1, wherein the step size (α) is identified based on the probability distribution function technique for a length X and is expressed as:

$$7 \mid \chi(x) \sim x^{-\alpha}$$

wherein, $$0 < \alpha < 2, E[X^2] = \infty.$$

3. The processor implemented method of claim 1, wherein the sampling point includes a point position (q') and a point orientation (θ') expressed as:

$$q' \leftarrow q + (\alpha + f_L(l))$$

$$\theta' = 2\pi(1 - e^{f_\theta(\theta)}).$$

4. A system comprising:
a memory storing instructions;
one or more communication interfaces; and
one or more hardware processors coupled to the memory via the one or more communication interfaces, wherein the one or more hardware processors are configured by the instructions to:

receive a plurality of inputs associated with a plurality of obstacles within a narrow passage of a real time environment, via a one or more hardware processors, the plurality of inputs comprise a plurality of dimensions of a configuration space of each of the plurality of obstacles (d), a plurality of obstacle geometry (o) of each of the plurality of obstacles, wherein the plurality of dimension of the configuration space comprise of a plurality of obstacle space ($C_{obs}$) and a plurality of free spaces ($C_{free}$), wherein the narrow passage is a constrained space between the plurality of obstacle space ($C_{obs}$) and the plurality of free spaces ($C_{free}$);

identify a step size (α), via the one or more hardware processors, based on the plurality of dimensions of the configuration space of each of the plurality of obstacles (d) and the plurality of obstacle geometry (o) using a probability distribution function technique;

iteratively determine a plurality narrow passage sampling points in the narrow passage for the narrow passage path sampling, via the one or more hardware processors, wherein the step of the determining the narrow passage sample among the plurality narrow passages sampling point, comprises:

generating a random configuration (q,θ) in the obstacle based on a random uniform sampling technique, wherein the random configuration comprises a position (q) defined by x, y and z coordinates and an orientation (θ) defined by Euler angles (Ψ, Θ, Φ);

identifying a sampling point (q',θ') using the random configuration (q,θ) based on a levy flight function and a collision detection technique, wherein the levy flight function is a category of random walk in which the step size (α) has a levy distribution, wherein the sampling point (q', θ') lies in the plurality of free spaces ($C_{free}$) and outside the plurality of obstacle space ($C_{obs}$), wherein when the dimension of the configuration space increase as in a manipulator sampling or a 3-dimensional (3D) sampling, then a number of levy distribution values increase, wherein the number of levy distribution values is equal to the dimension of the configuration space; and identifying, based on a levy flight bridge sampler technique, the narrow passage sample for narrow passage path sampling from the sampling point (q', θ'), wherein the levy flight bridge sampler technique comprises of:

joining the random configuration (q,θ) and the sampling point (q',θ') using a straight line;

extending the straight line along q' till a point q'', wherein q' is a midpoint of the extended line between qq'', wherein extension of the straight line is expressed as: (q,θ). q'=(q+q'')/2; and identifying the sampling point (q',θ') as a narrow passage the sampling point based on determining if the point q'' lies in the plurality of obstacle space ($C_{obs}$) based on the collision detection technique;

simulate narrow passage scenarios in 2-dimensional (2D) and 3-dimensional (3D) environments, wherein simulations are conducted for a 3-link, 5-link and 7-link manipulator, and results are simulated considering a bar shape obstacle scenario, a joint shape obstacle scenario and a teeth shape obstacle scenario, wherein for the joint shape obstacle scenario, a total execution time and a number of collision checking calls for levy flight bridge sampler are less, and wherein for the teeth shape obstacle scenario, simulation results obtained indicate superiority of the levy flight bridge sampler in terms of sampling quality; and display in real time the identified narrow passage path sampling on an output module.

5. The system of claim 4, wherein the one or more hardware processors are configured by the instructions to identify the step size ($\alpha$ based on the probability distribution function technique for a length X and is expressed as shown below:

$$f_x(x) \sim x^{-\alpha}$$

wherein, $$0 < \alpha < 2, E[X^2] = \infty.$$

6. The system of claim 4, wherein the one or more hardware processors are configured by the instructions to identify the sampling point $(q',\theta')$, wherein the sampling point includes a point position $(q')$ and a point orientation $(\theta')$ expressed as:

$$q' \leftarrow q + (\alpha + f_L(l))$$

$$\theta' = 2\pi(1 - e^{f_\theta(\Theta)}).$$

7. A computer program product comprising a non-transitory computer readable medium having a computer readable program embodied therein, wherein the computer readable program, when executed on a computing device, causes the computing device to:

receive a plurality of inputs associated with a plurality of obstacles within a narrow passage of a real time environment, via a one or more hardware processors, the plurality of inputs comprise a plurality of dimensions of a configuration space of each of the plurality of obstacles (d), a plurality of obstacle geometry (o) of each of the plurality of obstacles, wherein the plurality of dimension of the configuration space comprise of a plurality of obstacle space ($C_{obs}$) and a plurality of free spaces ($C_{free}$), wherein the narrow passage is a constrained space between the plurality of obstacle space ($C_{obs}$) and the plurality of free spaces ($C_{free}$);

identify a step size ($\alpha$), via the one or more hardware processors, based on the plurality of dimensions of the configuration space of each of the plurality of obstacles (d) and the plurality of obstacle geometry (o) using a probability distribution function technique;

iteratively determine a plurality narrow passage sampling points in the narrow passage for the narrow passage path sampling, via the one or more hardware processors, wherein the step of the determining the narrow passage sample among the plurality narrow passages sampling point, comprises:

generating a random configuration $(q,\theta)$ in the obstacle based on a random uniform sampling technique, wherein the random configuration comprises a position (q) defined by x, y and z coordinates and an orientation ($\theta$) defined by Euler angles ($\Psi, \Theta, \Phi$);

identifying a sampling point $(q',\theta')$ using the random configuration $(q,\theta)$ based on a levy flight function and a collision detection technique, wherein the levy flight function is a category of random walk in which the step size ($\alpha$) has a levy distribution, wherein the sampling point $(q', \theta')$ lies in the plurality of free spaces ($C_{free}$) and outside the plurality of obstacle space ($C_{obs}$), wherein when the dimension of the configuration space increase as in a manipulator sampling or a 3-dimensional (3D) sampling, then a number of levy distribution values increase, wherein the number of levy distribution values is equal to the dimension of the configuration space; and identifying, based on a levy flight bridge sampler technique, the narrow passage sample for narrow passage path sampling from the sampling point $(q,\theta')$ '), wherein the levy flight bridge sampler technique comprises of:

joining the random configuration $(q,\theta)$ and the sampling point $(q',\theta')$ using a straight line;

extending the straight line along q' till a point q", wherein q' is a midpoint of the extended line between qq", wherein extension of the straight line is expressed as: (q, $\Theta$). q'=(q+q")/2; and identifying the sampling point $(q',\theta')$ as a narrow passage the sampling point based on determining if the point q" lies in the plurality of obstacle space ($C_{obs}$) based on the collision detection technique;

simulate narrow passage scenarios in 2-dimensional (2D) and 3-dimensional (3D) environments, wherein simulations are conducted for a 3-link, 5-link and 7-link manipulator, and results are simulated considering a bar shape obstacle scenario, a joint shape obstacle scenario and a teeth shape obstacle scenario, wherein for the joint shape obstacle scenario, a total execution time and a number of collision checking calls for levy flight bridge sampler are less, and wherein for the teeth shape obstacle scenario, simulation results obtained indicate superiority of the levy flight bridge sampler in terms of sampling quality; and display in real time the identified narrow passage path sampling on an output module.

* * * * *